Nov. 8, 1932.    C. L. EKSERGIAN    1,886,535
VEHICLE WHEEL NAVE CONSTRUCTION
Filed May 29, 1930
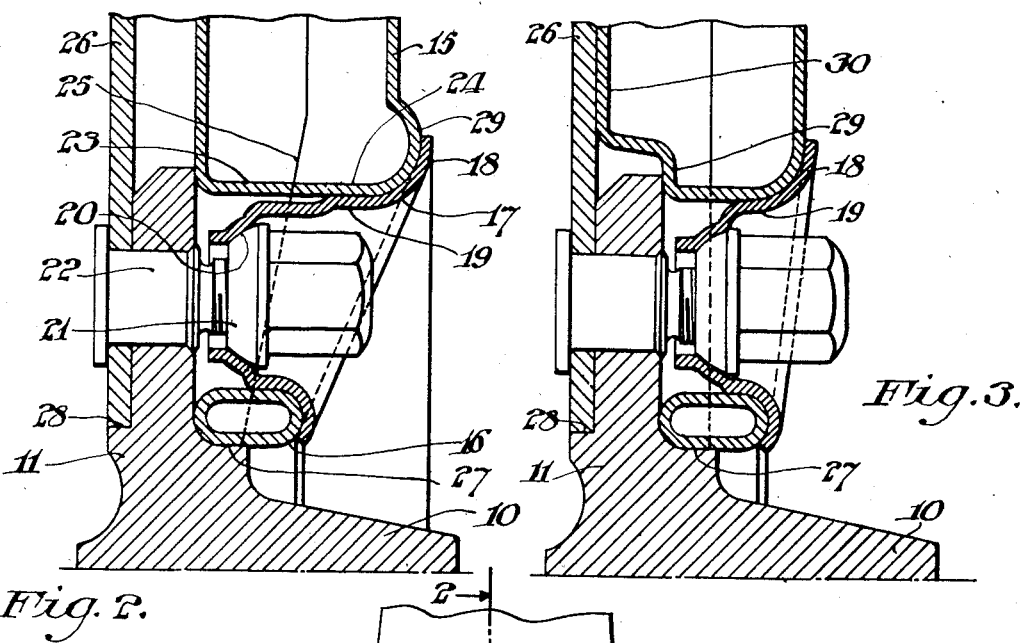
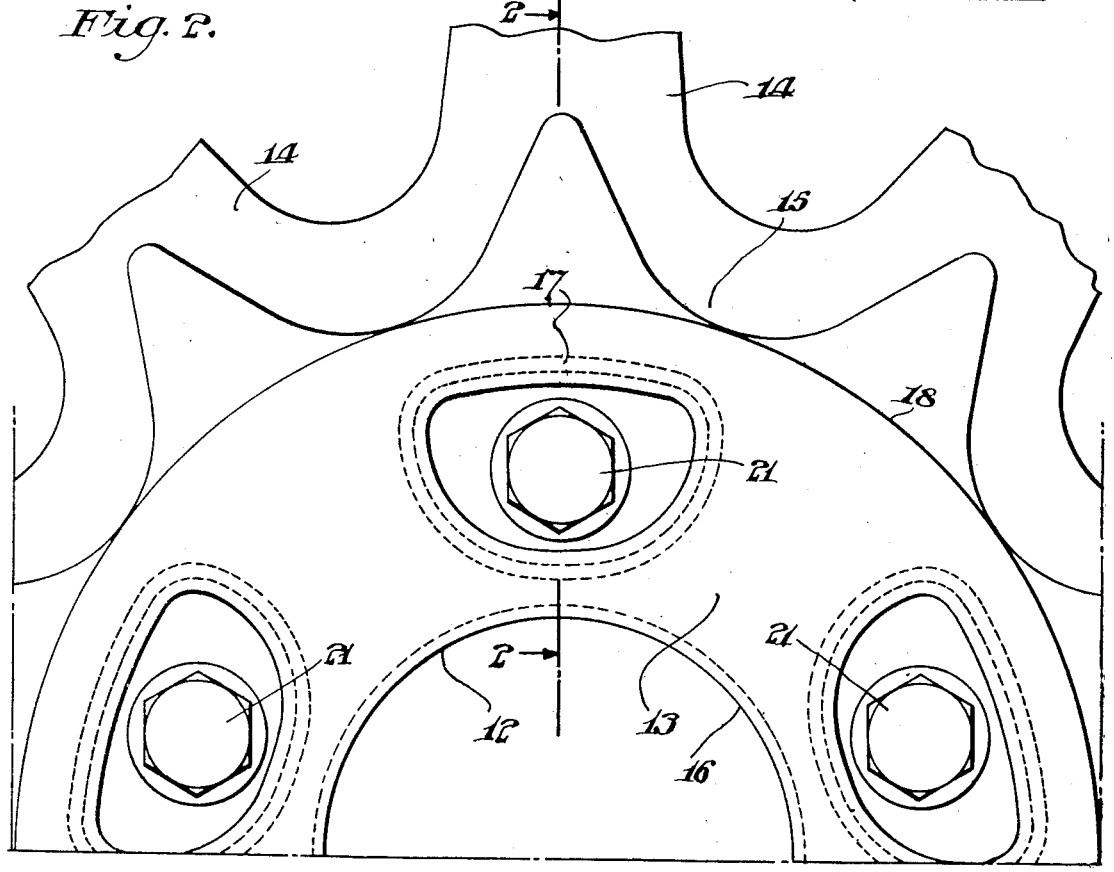
INVENTOR:
Carolus L. Eksergian,
BY
ATTORNEY.

Patented Nov. 8, 1932

1,886,535

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

VEHICLE WHEEL NAVE CONSTRUCTION

Application filed May 29, 1930. Serial No. 457,093.

My invention relates to the art of wheels, and it has been my object to produce a pressed metal wheel having a hollow nave which is provided with adequate stiffening means in its nave portion about the bolt holes with an adequate provision for securing a wheel to a hub flange.

My wheel resembles in its general structure, the wheel invented by George B. Reed and described in patent application Serial No. 390,002, filed September 3, 1929. It has been my object to improve upon that wheel by providing a still further reinforcing means in the nature of a clamp about the bolt holes.

Other objects of my invention and the manner in which I have achieved them will be obvious in the reading of the subjoined specification in connection with the accompanying drawing, in which Fig. 1 is a side elevation showing the nave portion of my improved wheel.

Fig. 2 is a sectional view on the line 2—2 showing the wheel attached to a hub and brake drum, and Fig. 3 is a view similar to Fig. 2 illustrating a modified form of my invention.

Referring to the drawing by reference characters, the numeral 10 indicates the hub of the vehicle. This hub is provided with a flange 11 having a seat 27 adapted to receive the inner peripheral portion of the nave of the wheel, and a second seat 28 adapted to receive the brake drum 26. The wheel body 12 consists of a nave portion 13 and a series of spokes 14, both of which are hollow. The nave portion of the wheel consists of a part 15 of substantially uniform cross section, with the exception of the rib portions 29, and a tapered portion 16 which terminates at the inner periphery of the wheel. This inner periphery seats upon the shoulder 27 of the hub flange.

The wheel is preferably formed of two substantially similar pressed metal sections integrally united along a radial medial line by welding. In the formation of the stampings from which the wheel is made, it is provided with bolt holes which are flanged inwardly as indicated at 23 and 24. The flanges formed in the opposite portions of the metal body are of complemental shapes and abut when the remainder of the wheel bodies are brought into abutting relationship. They may thus be integrally welded during the welding of the main wheel portions. This step is preferably done by an electrical process, such as butt or flash welding. The wheel thus comprises an integral body of sheet metal having flanged bolt holes extending throughout its width, the flanges of the bolt holes being likewise integrally joined, as indicated at 25. In order to reinforce the wheel in its vulnerable nave portion and effect its secure attachment to the permanent hub of the vehicle, I have provided an annular clamp 18 having a plurality of openings therein spaced symmetrically with respect to the bolt receiving openings in the wheel body proper. These openings in the clamp are depressed, as indicated at 19, within the openings of the wheel body and are constricted at 20 to provide sunken seats within the hollow nave of the wheel for the reception of the securing nuts 21. The clamp may be welded or otherwise permanently secured to the outer stamping of the wheel if desired.

In the modification of Fig. 3, I have illustrated my invention in connection with a wheel which has an offset portion 29 adapted to seat against the flange of the hub, the inner side 30 of the wheel seating against the brake drum. This gives a very large bearing surface between the body of the wheel and the surfaces of the hub and brake drum against which it bears, and thereby gives an added measure of rigidity to the wheel structure.

It will be seen that I have produced an artillery steel wheel having a very rigid nave portion due to its peculiar configuration and the attachment of reinforcing clamps to it in telescoping relationship at its weakest points.

Modifications of my invention will be obvious to those skilled in the art. I do not therefore wish to be limited except by the sub-joined claims as interpreted in the light of my invention.

While I have described my invention in connection with a wheel of the artillery type, it will be obvious that it is applicable to any wheel having a hollow nave portion.

What I claim is:

1. A vehicle wheel comprising, in combination, a hub, a flange on said hub, a wheel body having a hollow nave portion with an opening therethrough for the reception of a securing bolt and a clamp adapted to abut the wheel about said opening and having a portion adapted to enter said opening, said clamp being constricted adjacent the inner axial extremity of said portion to provide a seat for a securing nut within the hollow nave of the wheel.

2. A vehicle wheel comprising, in combination, a hub, a flange on said hub, a wheel body having a hollow nave portion with an opening therethrough for the reception of a securing bolt and a tubular body adapted to abut the wheel about said opening and having a portion adapted to enter said opening, said tubular body being constricted adjacent the inner axial extremity of said portion to provide a seat for a securing nut within the hollow nave of the wheel.

3. A vehicle wheel comprising, in combination, a hub, a flange on said hub, a wheel body having a hollow nave portion and openings therethrough for the reception of securing bolts, an annular clamp adapted to abut the outer side of the hollow nave of the wheel body and having openings therethrough with flanged margins adapted to enter the openings in the hollow nave of the wheel body, said flanged margins having seats formed thereon adapted to seat mounting nuts within said openings.

4. A vehicle wheel comprising, in combination, a hub, a flange on said hub, a wheel body having a hollow nave portion and openings therethrough for the reception of securing bolts, an annular clamp adapted to abut the outer side of the hollow nave of the wheel body and having openings therethrough with flanged margins adapted to enter the openings in the hollow nave of the wheel body, the openings in said clamp being constricted adjacent their inner axial extremities for the reception of securing nuts within the hollow nave of the wheel body.

In testimony whereof I hereunto affix my signature.

CAROLUS L. EKSERGIAN.